United States Patent [19]

Kidwell, Jr.

[11] 4,049,893
[45] Sept. 20, 1977

[54] HYDROGENATED WAXY OLEFIN AND PROCESS OF MAKING SAME

[75] Inventor: Louis E. Kidwell, Jr., Shreveport, La.

[73] Assignee: Pennzoil Company, Houston, Tex.

[21] Appl. No.: 571,613

[22] Filed: Apr. 25, 1975

[51] Int. Cl.$^2$ .............................................. C08F 8/04
[52] U.S. Cl. .............................. 526/26; 260/677 H; 260/683.9; 526/22; 526/25
[58] Field of Search .......... 260/94.9 GD, 96 H, 683.9, 260/677 H; 450/613, 613.5; 526/25, 26, 22

[56] References Cited

U.S. PATENT DOCUMENTS

| | | | |
|---|---|---|---|
| 3,285,902 | 11/1966 | Schmeidl | 260/94.9 GD |
| 3,432,518 | 3/1969 | Kallenbach | 526/26 |
| 3,475,399 | 10/1969 | Peters et al. | 526/25 |
| 3,519,588 | 7/1970 | Hagemeyer et al. | 260/29.6 |
| 3,737,477 | 6/1973 | Stearns et al. | 260/683.9 X |

*Primary Examiner*—William F. Hamrock
*Attorney, Agent, or Firm*—Delmar L. Sroufe; Frank B. Pugsley; Larry B. Feldcamp

[57] ABSTRACT

This invention relates to a substantially hydrogen saturated hydrocarbon product formed by the hydrogenation of waxy polyethylene alpha-olefin having an average molecular weight of about 350 to about 900. The hydrogenation is conducted at pressures ranging from about 200 psig to about 1000 psig and at hydrogenating temperatures below about 750° F in the presence of a conventional active hydrogenation catalyst. The resulting product may be utilized as a substitute for petroleum wax in the production of various compositions, such as carpet backing compositions, candle wax compositions, pressure sure sensitive tape, paper coating compositions, coatings for fruit, rust preventatives, cosmetics, and similar products. In such compositions the novel hydrogenated alpha olefins may be substituted for petroleum wax as customarily used or it may be used as an extender in any desired proportion with petroleum wax.

21 Claims, No Drawings

HYDROGENATED WAXY OLEFIN AND PROCESS OF MAKING SAME

BACKGROUND OF THE INVENTION

1. Field of the Invention:

This invention relates to a waxy hydrocarbon consisting of straight and branch chain hydrogen saturated molecules formed by hydrogenation of polyethylene alpha olefins. The composition is formed by reacting hydrogen with a polyethylene alpha olefin produced by the socalled Ziegler process. The resulting hydrogen saturated product has properties similar in most respects to those of petroleum wax, but it is free of aromatic hydrocarbons and does not normally require filtration or other processing to remove color elements and ultraviolet light-absorbing impurities.

2. Description of the Prior Art:

Hydrocarbon waxes have long been known to the art where they have found many uses in the paper industries, in the manufacture of candles, in rust preventatives, drawing compounds, electrical insulators, match coatings, coating of citrus fruits, manufacture of crayons, etc. However, paraffin waxes are in very short supply and there is a need for suitable substitute materials. Until the discovery of the present invention, there has been no economical substitute for petroleum wax with general applicability to the various uses of petroleum wax.

It has been suggested that polymers comprising alpha olefins having chain lengths approximately equal to those of naturally occurring waxes may be blended with petroleum paraffin waxes to produce compositions having properties in some respects superior to petroleum wax compositions. Such blends are discussed in U.S. Pat. No. 3,772,233.

However, it has been found that such alpha olefins lack oxidation stability and as a result compositions incorporating them are susceptible to undesirable cracking and brittleness. In some applications, such as carpet backing compositions, the use of an alpha olefin is precluded because the cracking, brittleness and flaking off result in an effective life of the backing composition which is much shorter than the life of the carpet.

Therefore, it is an object of this invention to provide a novel waxy composition having stability against oxidation.

Another object of this invention is to provide a waxy composition generally adapted to be blended with or substituted for naturally occurring petroleum wax.

Another object of this invention is to provide a wax composition of high purity and free of aromatic hydrocarbons.

Other objects and advantages of this invention will be apparent from the following description, examples, and claims.

SUMMARY OF THE INVENTION

The wax composition of the present invention comprises a substantially saturated hydrocarbon and preferably a completely saturated hydrocarbon formed by hydrogenation of polyethylene alpha olefins having an average molecular weight of 350 to 900. Hydrogenation is conducted by contacting the olefins with at least a stoichiometrical amount of hydrogenaffording gas at pressures ranging from about 100 psig to about 1000 psig and hydrogenation temperatures from as low as about 400° F to about 750° F, preferably from about 500° F to about 600° F, in the presence of an active hydrogenation catalyst. The color of the hydrogenated product is zero as determined by ASTM D-1500. It has a viscosity in Saybolt universal seconds of between about 40 and about 55 at 210° F and a melting point of about 150 to 180° F (ASTM D-87). The penetration at 77° F (ASTM D-1321) ranges from about 20 to about 40. Analysis shows that the hydrogenated product contains above 50% straight chain hydrocarbons and that in excess of about 95% of the molecules have 22 or more carbon atoms.

DESCRIPTION OF PREFERRED EMBODIMENTS

Alpha olefins suitable for hydrogenation in accordance with the present invention are produced from the polymerization of ethylene by a process resulting in a high percentage of straight chain hydrocarbons. Suitable polyethylene alpha olefins may be made by the Ziegler process for the polymerization of ethylene by the methods described in "Kirk-Othmer, Encyclopedia of Chemical Technology," Second Ed., Vol. XIV, pp. 259-278.

Ziegler polyethylenes are prepared by introducing gaseous ethylene into a low pressure vessel containing an inert diluent and a catalyst. The catalyst typically consists of a combination of aluminum alkyls and halides of titanium. The mechanism of the polymerization involves ethylene molecules feeding into a point between titanium and the alkyl group originally in the catalyst complex; thus, linearity of the polymer chain is achieved. However, there is some degree of branching, attributable, for example, to dimerization to 1-butene, which then enters into the polymerization to give short-chain branching. Neither aromatic nor naphthenic cyclic compounds are normally produced in ethylene polymers of this process. By way of contrast, it should be noted that small amounts of cyclic compounds are present in petroleum paraffin waxes.

Methods of controlling the polymerization of the ethylene to obtain a product of the desired waxy or paraffinlike material include variations in the amount of catalyst or activator, and the temperature and the pressure to be maintained during polymerization. Catalyst and processes which may be used for this polymerization are known in the art. For example, such catalysts and processes are described in the Ziegler et al U.S. Pat. No. 2,699,457, dated Jan. 11, 1955 in which the polyethylene alpha olefin of Examples 2 and 7 is illustrative of waxy polyethylenes suitable for hydrogenation in accordance with the present invention.

Suitable alpha olefins for use as feed materials in the present invention should have compositions in which at least 95% of the molecules contain 22 carbon atoms or more and preferably the $C_{20}$ and lower content should be less than about 2%. The average molecular weight should be within the range of 350 to 900 and preferably within the range of 350 to 600. The normal straight chain hydrocarbon content should be at least about 45% and preferably above 50%. The flash point should be above 420° F as measured by the ASTM D-92 test procedure. The viscosity of suitable alpha olefins measured at 210° F in Saybolt universal seconds is between about 40 and about 50, and the melting point as measured by ASTM test procedure D-87 will range from 150° to 180° F.

The properties of a typical polyethylene alpha olefin feed stock are shown in Table I.

TABLE I

| PROPERTIES OF $C_{24}$ + WAXY OLEFIN | |
|---|---|
| | Value |
| Molecular Wt. | 400 |
| Specific Gravity | 0.827 |
| Flash Point, °F | 470 |
| Vis., SUS | |
| at 210° F | 46.5–48.8 |
| at 180° F | 52.8 |
| Melting Point, °F | 154 |
| Typical Composition, % | |
| < C | 2 Max. |
| $C_{24}$–$C_{28}$ | 35–48 |
| $C_{30}$+ | 50–65 |

Hydrogenation of the polyethylene alpha olefin is conducted in accordance with conventional hydrogenation processes. Any active hydrogenation catalyst component or components may be used. Suitable catalyst are generally Group VI-B and Group VIII metals and compounds thereof as described in the literature and in patents such as U.S. Pat. Nos. 2,147,268, 2,566,521, 2,706,211, 2,998,377, 3,089,841, 3,100,808, 3,156,736, 3,182,097, 3,365,385 and 3,404,192. Either unsupported or supported hydrogenation catalyst may be used in the practice of the present invention; however, it is presently preferred to use an active hydrogenation catalyst supported upon a suitable material such as pumice, porcelain, activated clays, alumina, silica alumina and the like. Preferred catalysts include nickel on supports such as refractory, alumina or Kieselguhr; nickel oxide and tungsten oxide which is treated with a sulfide before use to convert the components to nickel sulfide and tungsten sulfide on a support such as alumina or silica alumina; and a catalyst comprising 0.4 weight percent platinum on an alumina support with, in some compositions, a minor amount of a halide. Still other catalyst which have been successfully used in the hydrogenation of the waxy olefins of this invention include cobalt molybdate containing between about 1 and 5% cobalt oxide or sulfide and between about 5 and 20% (by weight) molybdenum oxide or sulfide. Preferably the latter catalyst is subjected to a sulfide treatment to convert the active hydrogenating components to the sulfide forms.

The preparation of presently preferred supported catalyst compositions of this invention may be achieved by impregnating the carrier material with a solution containing soluble compounds of the Group VI-B metal or metals, such as ammonium meta-tungstate, and/or soluble compounds of the Group VIII metal or metals such as nickel nitrate. After the desired proportions of such soluble compounds have been placed in the impregnating solution, the impregnated carrier is dried and calcined. In order to improve the activity of the nickeltungsten and the cobalt-molybdenum catalysts it is preferred to sulfide the same prior to use by treatment with a suitable sulfiding agent such as hydrogen sulfide, carbon disulfide, ethyl mercaptan, methyl sulfide, propyl sulfide, ammonium sulfide, or the like. The product of the sulfiding step is a mixture of sulfides, oxides, free sulfur and free metal. The sulfiding operation is usually conducted at a temperature of 500° F to 700° F for a period of from about 2 to 20 hours.

In the use of multiple catalyst impregnation techniques, the proportions of the soluble compounds placed in solution are adjusted to provide the desired amount of metal and the desired atomic ratio of metals on the carrier support. When multiple catalyst are used, the preferred atomic ratios of Group VIII metals and Group VI-B metals in either the supported or unsupported form should be in a range from about 9:1 and 1:3.

Presently, the catalysts of especial preference are nickel, platinum, sulfided cobalt molybdenum and a sulfided nickel-tungsten catalyst with a nickel-tungsten atomic ratio from about 3:1 to about 8:1.

In the preferred supported form, the catalyst usually contains about 0.4 to 40% metals by weight based upon the total weight including the carrier, and preferably about 20 to 35% metals are impregnated on the carrier. It should be noted, however, that substantially higher amounts of some catalysts may be employed. For example, as high as up to about 75 weight percent nickel have been employed by impregnation on a catalyst carrier such as silica gel, activated char, alumina, magnesia, and the like.

Hydrogenation of the polyethylene alpha olefins is preferably conducted under relatively mild hydrogenation conditions. At least a stoichiometric amount of hydrogen is required since substantially complete hydrogen saturation of the double bond is desired. Preferably an excess of hydrogen is used to insure substantially complete hydrogenation and in practice a hydrogen-feed ratio of above about 800 standard cubic feet of hydrogen per barrel of feed has been used with the preferred range of about 1000 to about 2000. The hydrogen gas may be recycled since it has been found that the hydrocarbon contaminants from recycled gas are not harmful to the process. In fact, the use of pure hydrogen is not necessary to the practice of the hydrogenation process and any hydrogen-affording gas such as gas stream mixtures containing available hydrogen may be used for olefin saturation as well as pure hydrogen.

Although the polyethylene alpha olefins utilized in the process of the present invention are normally free of sulfur, it is recognized that in some instances sulfur contamination may be present, as from storage and shipping containers. As is well known to those skilled in the art, sulfur compounds should be minimized in the feed contacting a nickel catalyst. Accordingly, when nickel catalysts are used it is preferred that a guard tube be installed in the stream prior to the hydrogenation reactor. The conventional guard tube contains zinc, iron, copper, lead or their compounds, especially oxides. Other suitable materials for the guard tube include the nickel catalyst of the process or charcoal impregnated with alkaline materials.

In like manner a scrubber or guard tube for the recycle of hydrogen-affording gas may be used to protect the catalyst from any build-up of sulfur compounds which would poison the nickel catalyst. As in the case of the guard tube for the liquid feed, such scrubber or guard tube should contain zinc, iron, copper, lead or their compounds, especially oxides. Also, the nickel catalyst of the process may be used for this purpose or charcoal impregnated with alkaline materials or caustic solutions (with a downstream drier).

In the preferred continuous process, the olefinic feed is introduced into a reactor where it is contacted with catalyst in the presence of the hydrogen affording gas. The reaction zone is operated under temperature and pressure conditions selected to promote efficient hydrogenation, but preferably below temperatures and pressures which would cause cracking. A pressure up to 1000 psig may be used, but preferably a range of from about 200 psig to about 650 psig is used. The temperature of the catalyst bed is maintained and arranged between the lowest practical hydrogenation temperature (about 400° F) and about 750° F, preferably between about 500° F and about 700° F, and most desirably between about 525° F and about 600° F.

In the practice of the process, the catalyst-olefin ratio may vary widely, depending upon the useful life of the catalyst employed. In conducting the process as a batch process substantial variation in the amount of catalyst may be used as is well known in hydrogenation processes; however, for purposes of laboratory tests one part of catalyst for about 10 parts polyethylene alpha olefin gives satisfactory results. In the continuous process the pertinent factors are the life of the catalyst and the liquid hourly space velocity (LHSV) which may vary from about 0.5 to about 6.0 volumes of hydrocarbons per hour per volume of catalyst bed measured in the same units of volume. Best results have been obtained where the LHSV ranges from about 1.0 to about 5.3 hr.$^{-1}$.

In the case of nickel catalyst, nickel is subject to sulfur poisoning. For a particular feed stream, the nickel catalyst will have about one-half of its usual activity remaining when it has about 0.25 weight percent sulfur content. In the laboratory test of the present process, the ultimate limits of catalyst use were not reached. Catalyst-olefin ratios of up to one part catalyst to 60 parts olefin were noted; however, substantially greater catalyst life would be expected in commercial use.

The characteristics of the waxy hydrogenated olefin compared with petroleum wax are shown in Table II below:

TABLE II

| | Petroleum Wax | | | Hydrogenated Product |
|---|---|---|---|---|
| | Unfiltered | | Filtered | From Olefin |
| | 125/127 | Hydro-treated | 125/127 | |
| Melt Pt., ° F, D-87 | 125/127 | 125 | 125/127 | 169 |
| Flash Pt., ° F, D-92 | — | 435 | 410, 420 | 450, 465 |
| Vis. at 210° F, SUS | — | 38.0 | 38.8, 38.5 | 46.2, 47.0 |
| Color, ASTM D-1500 | — | 1.5 | 0.0 | 0.0 |
| n-Paraffin, Wt.% (mole sieve) | — | 58.5 | 67.3 | 53.2 |
| FDA Test 121.1156* | Max. | | | |
| 280–289 | .15 | 0.47 | 0.24 | 0.09 | 0.05 |
| 290–299 | .12 | 0.39 | 0.28 | 0.08 | 0.04 |
| 300–359 | .08 | 0.31 | 0.36 | 0.06 | 0.03 |
| 360–400 | .02 | 0.05 | 0.06 | 0.00 | 0.004 |
| Penetration at 77° F,D-1321 | — | 36 | 35–45 | 23–33 |

*Ultraviolet absorbance Per Cm. of Path.

Utilizing the polyethylene alpha olefin feed stock having the properties shown in Table I, an initial production of hydrogenated polyethylene product was prepared in a batch one liter autoclave reactor as described by the data in Table III, runs 1 and 2. Although the reaction time was somewhat shorter in run 2, hydrogen absorption had stopped; therefore, products from the two experiments were mixed. Hydrogenation was complete as shown by the infrared spectrum of the mixture which showed none of the olefin bands at 6.05 and 11 microns.

Thereafter an isothermal reactor was prepared, with a 751 ml. catalyst bed. Feed was pumped at about 220° F from a steam-lagged aluminum tank on a balance pan, to the reactor. Reactor effluent was discharged into a separator from which the hydrogenated product was obtained. Hydrogen gas was introduced into the feed at a mixing T upstream from the reactor. The catalyst used in all tests shown in Table III was a 40 weight percent nickel catalyst on a refractory support.

TABLE III

HYDROGENATION OVER NICKEL CATALYST

| Run No. | Olefin Feed Wt. per run | Catalyst History | Residence time, Hr. | LHSV hr.$^{-1}$ | Hydrogen Pr., psig | C.F./ bbl. | Temp., ° F | Time hr. | Total Cum. feed/cat. wt. ratio | IR Bands at 6.05 and 11.0λ |
|---|---|---|---|---|---|---|---|---|---|---|
| | | | Batch Reactor | | | | | | | |
| 1 | 460 | fresh[2] | 1.8 | — | 100–600 | — | 198–383 | 1.75 | 10 | absent |
| | | | 2.2 | — | 545–600 | — | 396–403 | 2.17 | | |
| 2 | 460 | fresh | 1.6 | — | 105–600 | — | 153–383 | 1.58 | 10 | absent |
| | | | 1.2 | — | 560–600 | — | 392–399 | 1.17 | | |
| | | | Continuous Reactor[1] | | | | | | | |
| 3 | 2,430 | fresh[3] | 0.70[4] | 1.4 | 600 | 1,220 | 392 | 1.75 | 2.88 | present |
| 4 | 3,740 | used in prev. exp. | 0.50 | 2.2 | 600 | 1,690 | 392 | 1.50 | 7.32 | present |
| 5 | 7,050 | " | 0.20 | 5.0 | 600 | 1,490 | 392 | 2.50 | 15.7 | " |
| 6 | 2,960 | " | 0.48 | 2.1 | 600 | 1,780 | 356 | 2.00 | 19.2 | " |
| 7 | 1,220 | " | 0.47 | 2.2 | 600 | 1,720 | 325 | 0.75 | 20.6 | " |
| 8 | 1,490 | " | 0.48 | 2.1 | 600 | 1,760 | 300 | 0.75 | 22.4 | " |
| 9 | 914 | " | 0.47 | 2.1 | 600 | 1,040 | 302 | 0.75 | 23.5 | " |
| 10 | 1,620 | " | 0.70 | 1.4 | 600 | 1,540 | 392 | 1.50 | 25.4 | " |
| 11 | 900 | " | 0.94 | 1.1 | 600 | 2,080 | 392 | 1.33 | 26.5 | " |
| 12 | 2,400 | " | 0.94 | 1.1 | 600 | 2,080 | 392 | 3.50 | 29.3 | " |
| 13 | 1,140 | " | 0.94 | 1.1 | 600 | 1,580 | 572 | 1.82 | 30.7[5] | absent |
| 14 | 9,000 | " | 0.94 | 1.1 | 600 | 1,640 | 752 | 14.75 | 41.4 | absent |
| 15 | 2,340 | " | 0.73 | 1.4 | 600 | 1,580 | 572 | 1.33 | 44.1 | " |
| 16 | 1,920 | " | 0.59 | 1.7 | 600 | 1,290 | 572 | 1.55 | 46.4 | " |
| 17 | 4,416 | " | 0.52 | 1.9 | 600 | 1,570 | 572 | 2.75 | 51.6 | " |
| 18 | 7,730 | " | 0.52 | 1.9 | 600 | 1,570 | 572 | 6.00 | 60.8 | " |

[1]The total accumulated feed used in Runs 3 through 18 was 51,270 g. The same catalyst charge was used for these runs.
[2]46 g. fresh catalyst used in each batch experiment.
[3]843 g. (751 ml.) heated to reaction temperature for each run with hydrogen flowing.
[4]Feed density at charge tank temperature of 220° F, was 0.756 g/cc.
[5]Liquid product recovery was 99.3–100 wt.% of the charge.

In all of the tests of Table III the products of the two batch runs and the products of runs 13 through 18 from the continuous reactor showed complete hydrogenation as indicated by infrared spectra analyses of these products which showed an absence of infrared bands at 6.05 and 11 microns. In the latter continuous runs, reaction conditions were LHSV ranging from 1.1 to 1.9 hr$^{-1}$, temperatures ranging from 572 to 752° F, pressure at 600 psig, and the ratio of hydrogen to feed from 1290 to 1640 standard cubic feet per barrel.

Additional tests employing other calalysts are shown in Table IV in which the products of runs 22, 23, 24, 27, 28, 30, 32, 33 and 34 which were conducted at temperatures equal to or less than 500° F were not completely hydrogenated as shown by an infrared spectra analysis. However, it is noted that in run 31, the temperature was 450° F and the infrared tests of this product showed that it was completely hydrogenated. The catalyst used in experiment 31 was apparently quite active. Further indication of the relationships of variables in operating conditions is indicated by a comparison of runs 34 and 35 in which the catalyst was the same and the only difference in the two runs was the amount of hydrogen used in the hydrogenation process. In run 34 in which less than 1030 standard cubic feet of hydrogen was used per barrel of feed the hydrogenation of the olefin was not complete but in run 35 with an increase to 1030 standard cubic feet per barrel hydrogenation was complete in the analyzed product.

It has been found that complete elimination of unsaturated bonds in the product may be assured in practice of the present invention with art-recognized hydrogenation catalysts at temperatures at least as low as about 525° F or even as low as about 400° F in batch runs or if the residence time is increased or the LHSV is reduced to give increased reaction time in a continuous reactor. Since the hydrogenation reaction is temperature dependent a more desirable rate of reaction may be assured by increasing the temperature above about 525° F.

In the above runs, no cracking occurred since the product received ranged from 98.8 to 101.6% of the feed charged.

Oxidation tests on the hydrogenated product of the present invention show that it has substantially greater resistance to oxidation than similar waxy olefins. A measure of oxidation of these hydrocarbon materials is indicated by the increase in viscosity when oxidized by bubbling dry air through the material at 275° F. An unsaturated waxy olefin was subjected to oxidation by passing dry air through the material at 275° F. After 48 hours the viscosity had increased over 250%. By way of comparison, the saturated product of the present invention was subjected to identical test conditions and the percent increase in viscosity was only 38.4%. This indicates the pronounced resistance to oxidation of the composition of the present invention, providing advantages and characteristics for uses requiring extended periods of use as hereinabove set forth.

I claim:

1. A process for the hydrogenation of waxy polyethylene olefins comprising reacting (a) a feed stock consisting of said waxy polyethylene alpha olefins, said alpha olefins having an average molecular weight in the range of 350 to 900, a normal straight chain hydrocarbon content of at least 45% and having at least 22 carbon atoms in at least 95% of the molecules of said alpha olefins with (b) a hydrogen affording gas in an amount sufficient to supply at least a stoichiometrical quantity of hydrogen to said feed stock by contacting said feed stock with said hydrogen-affording gas at pressures ranging from about 200 psig to about 1000 psig at hydrogenation temperatures below about 750° F in the presence of an active hydrogen catalyst.

2. The process of claim 1 in which said hydrogenation is conducted at a temperature ranging from about 500° F to about 700° F.

3. The process of claim 1 in which said hydrogenation of the polethylene olefin is conducted at a temperature maintained between about 525° F and about 600° F.

TABLE IV

HYDROGENATION WITH VARIOUS CATALYSTS IN A CONTINUOUS REACTOR

| Run No. | Catalyst | Reaction Conditions | | | | Ratio of Cum.Feed Used to Catalyst | | IR Bands at 6.05 and 11.0 λ |
|---|---|---|---|---|---|---|---|---|
| | | Temp. ° F | H$_2$ pr. psig | LHSV hr$^{-1}$ | SCF H$_2$ per bbl. feed | g./g | bbl/ft | |
| 19 | Nickel[1] | 561–586 | 600 | 1.3 | 1010 | | | absent |
| 20 | " | 567–577 | 590 | 1.4 | 853 | | | " |
| 21 | " | 573 | 600 | 1.4 | 916 | 84.8 | 16.2 | " |
| 22 | Platinum[2] | 257 | 600 | 1.1 | 1580 | | | present |
| 23 | " | 403 | 600 | 1.1 | 1580 | | | " |
| 24 | " | 484 | 600 | 1.1 | 1580 | | | " |
| 25 | " | 572 | 600 | 1.1 | 1580 | 29.4 | 3.76 | absent |
| 26 | Ni/W[3] | 588 | 600 | 1.1 | 14440 | | | " |
| 27 | " | 450 | 600 | 1.1 | 1440 | | | present |
| 28 | " | 500 | 600 | 1.5 | 1440 | | | " |
| 29 | " | 527 | 600 | 1.5 | 1440 | 27.3 | 6.23 | absent |
| 30 | Ni/W[4] | 400 | 600 | 1.1 | 1720 | | | present |
| 31 | " | 450 | 600 | 1.1 | 1720 | 7.13 | 1.10 | absent |
| 32 | Co/Mo[5] | 400 | 500 | 5.3 | <1030 | | | present |
| 33 | " | 500 | 500 | 5.3 | <1030 | | | " |
| 34 | " | 525 | 500 | 5.3 | <1030 | | | " |
| 35 | " | 525 | 500 | 5.3 | 1030 | | | absent |
| 36 | " | 550 | 500 | 5.3 | 1030 | 66.5 | 10.2 | " |

[1] 40 wt% Ni on refractory support.
[2] 0.4% wt% platinum on alumina.
[3] Sulfided nickel oxide and tungsten oxide on granular alumina support. 100% of the catalyst passes 3 mesh sieve and about 99.9% retained on 20 mesh sieve (Tyler designation).
[4] Sulfided nickel oxide and tungsten oxide on a granular alumina-silica support. 100% of the catalyst passes 3 mesh sieve and about 99.8% is retained on a 3 mesh sieve.
[5] Sulfided cobalt oxide and molybdenum oxide.

4. The process of claim 1 in which said hydrogenation is conducted by contacting said olefins with a hydrogen affording gas in an amount sufficient to supply between about 1000 SCF and about 2000 SCF of hydrogen per barrel of olefin feed.

5. The process of claim 1 in which said active hydrogenation catalyst is nickel.

6. The process of claim 1 in which said catalyst is platinum.

7. The process of claim 1 in which said catalyst is sulfided cobalt oxide and sulfided molybdenum oxide.

8. The process of claim 1 in which said catalyst is a sulfided nickel-tungsten catalyst.

9. The process of claim 1 in which said hydrogenation is conducted in a batch reactor and in which the olefin feed to catalyst weight ratio is about 10:1.

10. The process of claim 1 in which said hydrogenation is continued until said hydrocarbon product is free of unsaturated olefinic bonds.

11. A process for the continuous hydrogenation of waxy polyethylene alpha olefins comprising reacting (a) in a continuous reactor containing an active hydrogenation catalyst, said waxy polyethylene alpha olefins, said alpha olefins having an average molecular weight in the range of 350 to 900, a normal straight chain hydrocarbon content of at least 45%, and further having at least 22 carbon atoms in at least 95% of the molecules of said alpha olefins with (b) a hydrogen affording gas in an amount sufficient to supply at least a stoichiometrical quantity of hydrogen to said alpha olefins, said hydrogenation reaction being conducted at pressures ranging from about 200 psig to about 1000 psig at temperatures sufficient for hydrogenation but below about 750° F.

12. The process of claim 11 in which the LHSV of said reaction is maintained between about 0.5 and 6.0 measured as the volume of hydrocarbon per hour per volume of catalyst bed in corresponding units of volume.

13. The process of claim 12 wherein said LHSV is maintained between about 1.0 and about 5.3

14. The process of claim 11 in which said catalyst bed is maintained between about 500° F and 700° F.

15. The process of claim 11 in which said catalyst bed is maintained between about 525° and 600° F.

16. The process of claim 11 in which said active hydrogenation catalyst is nickel.

17. The process of claim 11 in which said catalyst is platinum.

18. The process of claim 11 in which said catalyst is sulfided cobalt oxide and sulfided molybdenum oxide.

19. The process of claim 11 in which said catalyst is a sulfided nickel-tungsten catalyst.

20. The process of claim 11 in which hydrogenation is continued until the hydrocarbon product is free of all unsaturated olefinic bonds.

21. A waxy composition comprising a substantially saturated oxidation-stable hydrocarbon product formed by the hydrogenation of polyethylene alpha olefins having an average molecular weight of 350 to 900, said alpha olefins having a normal straight chain hydrocarbon content of at least 45% and further having at least 22 carbon atoms in at least 95% of the molecules of said alpha olefins, said hydrogenation being conducted by contacting said olefins with at least a stoichiometrical amount of hydrogen in a hydrogen affording gas in the presence of an active hydrogenation catalyst at pressures ranging from about 200 psig to about 1000 psig and at hydrogenation temperatures below about 750° F.

* * * * *

UNITED STATES PATENT AND TRADEMARK OFFICE
CERTIFICATE OF CORRECTION

PATENT NO. : 4,049,893
DATED : September 20, 1977
INVENTOR(S) : Louis E. Kidwell, Jr.

It is certified that error appears in the above-identified patent and that said Letters Patent are hereby corrected as shown below:

Column 1, line 11, "socalled" should read -- so-called --

Column 1, line 65, "hydrogenaffording" should read
 -- hydrogen-affording --

Column 2, line 42, "paraffinlike" should read
 -- paraffin-like --

Column 3, Table I, 9th line under heading, "< C" should
 read -- < $C_{24}$ --

Column 3, line 54, "nickeltungsten" should read
 -- nickel-tungsten --

Column 7, Table IV, Run No. 26, "14440" should read
 -- 1440 --

Column 10, line 4, "claim 12" should read -- claim 11 --

Column 10, line 5, "5.3" should read -- 5.3. --

Column 10, line 9, "525°" should read -- 525°F --

Signed and Sealed this

Twenty-seventh Day of December 1977

[SEAL]

Attest:

RUTH C. MASON
Attesting Officer

LUTRELLE F. PARKER
Acting Commissioner of Patents and Trademarks

UNITED STATES PATENT AND TRADEMARK OFFICE
CERTIFICATE OF CORRECTION

PATENT NO. : 4,049,893
DATED : September 20, 1977
INVENTOR(S) : Lewis E. Kidwell, Jr.

It is certified that error appears in the above-identified patent and that said Letters Patent are hereby corrected as shown below:

Column 7, Table IV, Footnote 4 "3" (second appearance) should read -- 20 --

Signed and Sealed this

Second Day of May 1978

[SEAL]

Attest:

RUTH C. MASON
Attesting Officer

LUTRELLE F. PARKER
Acting Commissioner of Patents and Trademarks